United States Patent Office 3,321,531
Patented May 23, 1967

3,321,531
FLUORINATED BENZYL ETHER POLYMERS AND
PROCESS FOR THEIR PREPARATION
Robert Neville Haszeldine, Windyridge, Lyme Road, Disley, Cheshire, England, and John Michael Birchall, 22
Lorna Road, Cheadle Hulme, Cheshire, England
No Drawing. Filed Sept. 13, 1962, Ser. No. 223,553
Claims priority, application Great Britain, Sept. 19, 1961,
33,566/61
19 Claims. (Cl. 260—613)

This invention relates to organic polymers and to methods for their manufacture.

The number of organic polymers which are known is very great, and their use in many different applications is widespread. However, the number of such polymers which can be made with relative ease and which are yet stable and resistant to chemical or thermal attack is surprisingly few.

The present invention provides a new class of organic polymers which have high chemical and thermal stability and which are useful in applications where extremes of temperature, pressure or chemical attack are likely to be encountered, for example, as molding materials, lubricants, or lubricant additives.

In accordance with the invention, polymers are provided which are characterized by the repeating unit:

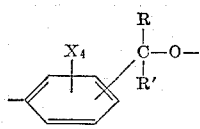

where X is hydrogen, fluorine, or chlorine and each of R and R' is hydrogen, a methyl group, a perfluoroalkyl group having not more than say 20 carbon atoms; an aryl, fluoroaryl or chloroaryl group. The four X atoms may be the same or different and as indicated the groups may appear at any of the positions on the ring.

Of particular interest are those species of the invention having repeating units of the general formula

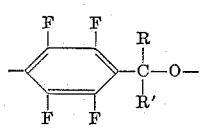

and especially polymers characterized by the repeating unit

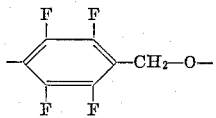

The polymers of the invention may have a wide range of molecular weights, embracing from say 2 to 10,000 of the repeating units identified above.

In accordance with the invention, the novel polymers can be prepared by reacting a compound having the general formula

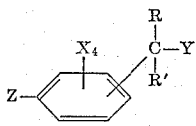

with a strong base or alkali.

In the formula X, R and R' are as defined above, Z is fluorine, chlorine or bromine and Y is chlorine, bromine, iodine, acyloxy or hydroxyl. It is preferred that Z as well as all four X atoms, be fluorine.

When Y is chlorine, bromine, iodine or acyloxy, it is necessary first to convert it into a hydroxyl group. The base used must therefore have a cation component capable of forming a salt with the anion:

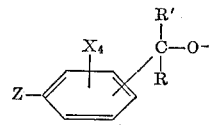

Suitable bases include aqueous solutions of the hydroxides of the alkali metals, particularly sodium and potassium and of the alkaline earth metals, particularly calcium. Salts of these hydroxides with weak acids such as $Na_2CO_3$ may also be used, and are intended to be included in the term "strong base" as used herein.

When Y in the starting material is hydroxyl, the reagent used may be either an aqueous solution of a strong base or of a salt of a strong base weak acid as described above, or an alkali or alkaline earth metal, for example, sodium, potassium or calcium. The metal may be used without a solvent, or with a non-aqueous solvent such as dioxane or diethyl ether.

The reaction may be carried out over a wide range of conditions. Thus the temperature may be from say $-20°$ C. to say $200°$ C., conveniently from 0 to $100°$ C. Pressure may range from say 1 to 200 atmospheres (absolute) and is preferably between 1 and 5 atmospheres (absolute). The molar proportions of the organic starting material ($ZC_6X_4CRR'Y$) to base or alkali metal is ordinarily between about 1:5 and 5:1. When an aqueous solution of a strong base is used, the concentration is desirably in the range between about .01 N and about 20 N, preferably between about 0.05 N and about 5 N.

Conveniently the reaction can be carried out by refluxing the starting material ($ZC_6X_4CRR'Y$) with an aqueous solution of the base at about $100°$ C.

It is preferred that Z and the —CRR'Y group should be in the para position in the starting material, and it is found in practice that, using the preferred starting materials in which every X, and also Z, represents fluorine, the polymer formed is joined up substantially entirely by removal of the para fluorine atom.

Thus, for example, when pentafluorobenzyl bromide is reacted with aqueous potassium hydroxide, a solid polyether is formed having the formula $$C_6F_5 \cdot CH_2O(C_6F_4 \cdot CH_2 \cdot O)_nH$$

where $n$ may be from 1 to say 10,000.

Cross-linked polymers can be produced by carrying out the reaction in the presence of a compound of the type $C_6F_4(CH_2Y)_2$, e.g. 1,4-di(bromoethyl)-tetrafluorobenzene.

The polymers provided by the present invention are new structural types and as noted above have a high degree of chemical and thermal stability. They can therefore be used in various applications where these properties are required. For example, they can be added to lubricants which are to be used under extremes of temperature to improve the properties of the lubricant, e.g. its viscosity, without danger of degradation or decomposition.

The pentafluorobenzyl halide starting materials are readily prepared from hexafluorobenzene by converting it, by the action of lithium methyl, to 2,3,4,5,6-pentafluorotoluene which is then treated with the appropriate halogen in the presence of light or ultra-violet irradiation. In a specific preferred embodiment of the invention, pentafluorobenzyl bromide is first reacted with $Na_2CO_3$ to form pentafluorobenzyl alcohol (with the production of a small amount of low polymer) and the alcohol is then further reacted with potassium hydroxide to give a main body of polymer. It may be added that the route to pentafluorobenzyl alcohol just mentioned gives better yields than that which involves the treatment of $C_6F_5CH_2NH_2$ with $HNO_2$ (Birchall and Haszeldine, J. Chem. Soc. 1961, p. 3719) and is more practicable than that which requires reacting $C_6F_5CHO$ with $LiAlH_4$ (Tetlow, J. Chem. Soc. 1961, p. 808). Good yields of $C_6F_5CH_2OH$ have also been obtained by reacting $C_6F_5CH_2OOCCH_3$ with $Na_2CO_3$.

The process of the invention is illustrated in the following examples.

EXAMPLE 1

*Polymer formation from 2,3,4,5,6-pentafluorobenzyl bromide*

Pentafluorobenzyl bromide (5.00 g.; 19.2 millimoles) is heated under reflux with potassium hydroxide (1.11 g.; 19.8 millimoles) in water (30 ml.) for 5 hours. The mixture is extracted with ether (4× 25 ml.) and the extracts washed with water, dried ($MgSO_4$), and evaporated. The polymer (3.51 g.) is extracted with n-hexane. The soluble polymer fraction is recrystallized several times from n-hexane and gives a white solid (1.82 g.; 54%), M.P. 102–104°, identified as the polymer

(Found: C, 45.6; H, 1.5, $C_{21}H_7F_{13}O_3$ requires C, 45.5; H, 1.3%). The infrared spectrum of this material is consistent with the proposed structure.

EXAMPLE 2

*Polymer formation from 2,3,4,5,6-pentafluorobenzyl chloride*

Pentafluorobenzyl chloride (5.0 g.; 25.2 millimoles) is heated under reflux with potassium hydroxide (1.41 g.; 25.2 millimoles) in water (25 ml.) for 10 hours. The mixture is extracted with ether (4× 25 ml.) and the extracts washed with water, dried ($MgSo_4$) and evaporated. The residual polymer (3.71 g.) is extracted with n-hexane and the hexane-soluble polymer recrystallized from n-hexane to give a solid polymer (2.61 g.; 58%) M.P. 90–100° C. with an infrared spectrum similar to that of the sample description above.

EXAMPLE 3

*Preparation of polymer and 2,3,4,5,6-pentafluorobenzyl alcohol from pentafluorobenzyl bromide and sodium carbonate*

2,3,4,5,6-pentafluorobenzyl bromide (4.3 g., 0.016 mole) and sodium carbonate (8 g., 0.075 mole) in water (42 ml.) are heated under reflux for 31 hours. The mixture is extracted with ether, and the extracts dried ($MgSo_4$) and distilled under reduced pressure to give 2,3,4,5,6-pentafluorobenzyl alcohol (2.7 g., 83%) M.P. 30–32°, B.P. 110–116°/52 mm., identified and shown to be pure by infrared spectroscopy and gas-liquid chromatography.

The residue from the distillation (0.3 g.) is dissolved in chloroform and the solution decolourised with animal charcoal. Removal of the solvent then gives a pale yellow solid, shown by infrared spectroscopy to be the polymer $C_6F_5 \cdot CH_2 \cdot O[\cdot C_6F_4 \cdot CH_2 \cdot O \cdot]_2 \cdot H$.

EXAMPLE 4

*Preparation of polymer from 2,3,4,5,6-pentafluorobenzyl alcohol and potassium hydroxide*

2,3,4,5,6-pentafluorobenzyl alcohol (2.0 g., 0.01 mole) is heated under reflux with potassium hydroxide (1.0 g., 0.018 mole) in water (9 ml.) for 13 hours. The solid product is separated by filtration, washed with water (4× 25 ml.) and ethanol (2× 25 ml.) and dried over phosphorus pentoxide in a vacuum desiccator. The resulting pale yellow solid (0.8 g.), M.P. 182–190°, is identified as the polymer $[\cdot C_6F_4 \cdot CH_2 \cdot O \cdot]_n$ by infrared spectroscopy and elemental analysis. [Found: F, 41.5% $(C_7H_2F_4O)_n$ requires F, 42.7%]. The high chain length of the polymer is further indicated by the high melting point, the very weak absorption at $3\mu$ in the infrared (showing the small number of hydroxyl end-groups), and its complete insolubility in ethanol, ether, chloroform, carbon tetrachloride, methylene chloride, dioxane, and n-hexane.

EXAMPLE 5

*Preparation of the polymer from 2,3,4,5,6-pentafluorobenzyl acetate*

Pentafluorobenzyl acetate (2.0 g., 0.008 mole) is heated under reflux with potassium hydroxide (2.0 g., 0.036 mole) in water (15 ml.) for 36 hours. The resulting solid is removed by filtration, washed with water and ethanol, dried in a vacuum desiccator, and identified as the polymer $[\cdot C_6F_4 \cdot CH_2 \cdot O \cdot]_n$ by infrared spectroscopy.

EXAMPLE 6

*Preparation of the polymer from 2,3,4,5,6-pentafluorobenzyl alcohol and sodium carbonate*

2,3,4,5,6-pentafluorobenzyl alcohol is heated under reflux with a four molar excess of strong aqueous sodium carbonate solution for 100 hours. Unchanged pentafluorobenzyl alcohol is then removed by steam-distillation, and the solid polymer is obtained by filtration of the residue.

EXAMPLE 7

*Preparation of the polymer from 2,3,4,5,6-pentafluorobenzyl alcohol and potassium*

Metallic potassium is added in small portions to a four molar excess of vigorously stirred pentafluorobenzyl alcohol heated under reflux on a steam bath. The mixture is heated at 100° for 24 hours, an excess of water is added, and the unchanged alcohol is removed by distillation. The solid polymer is recovered by filtration of the residue.

EXAMPLE 8

*Preparation of starting materials*

2,3,4,5,6-pentafluorotoluene, an intermediate in the preparation of the starting materials used in the examples above, may be made by one of two methods:

METHOD 1

A cold (−10° C.) solution of 0.82 M methyl lithium (0.258 mole MeLi) in tetrahydrofuran (317 ml.), prepared from methyl chloride, is added to hexafluorobenzene (40.0 g.; 0.216 mole) in tetrahydrofuran (200 ml.) under nitrogen. The stirred mixture is cooled to −60° C. ±5° throughout the addition (2 hours) and for 90 minutes afterwards, then allowed to warm to 0° C. and poured into ice-cold water (600 ml.) containing hydrochloric acid (5 N; 80 ml.). The mixture is extracted with petroleum ether (B.P. 30–40°; 4× 200 ml.), and the extract dried ($MgSO_4$) and fractionated to give 2,3,4,5,6-pentafluorotoluene (27.9 g.; 71%) (Found: C, 46.2; H, 1.7. $C_7H_3F_5$ requires C, 46.1; H, 1.7%), B.P. 117–118°/762 mm. $n_D^{20}$ 1.4023.

METHOD 2

No reaction is apparent when 5 ml. of a 1.4 M solution of methyl lithium in diethyl ether is added to hexafluorobenzene (44.5 g., 0.239 mole) in diethyl ether (150 ml.) at −50° C. under nitrogen. The stirred mixture is allowed to warm to −20° C. when the separation of a black precipitate shows that reaction is beginning. The remainder of the methyl lithium solution (157 ml.; 0.226 mole MeLi total) is added over two hours, whilst the reaction mixture is kept at −15° C. ±2°. The mixture is stirred at −10° C. for a further 30 minutes, allowed to warm to room temperature, and poured into ice-cold water (500 ml.) containing hydrochloric acid (5 N; 60 strong bases having cation components capable of forming salts with the anion

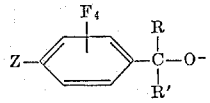

(b) alkaline metals and (c) alkaline earth metals, at a temperature between about −20 and about 200° C. and at a pressure between about 1 and about 200 atmospheres.

14. A method for making a polymeric product characterized by the repeating unit

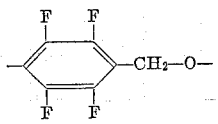

which comprises reacting 2,3,4,5,6-pentafluorobenzyl bromide with an aqueous solution of a strong base having a cation component capable of forming a salt with the anion

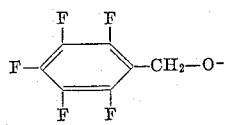

at a temperature of between about −20 and about 200° C. and at a pressure of between about 1 and about 200 atmospheres.

15. A method for making a polymeric product characterized by the repeating unit

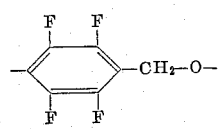

which comprises reacting 2,3,4,5,6-pentafluorobenzyl chloride with an aqueous solution of a strong base having a cation component capable of forming a salt with the anion

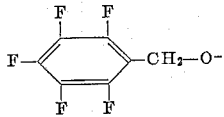

at a temperature of between about −20 and about 200° C. and at a pressure of between about 1 and about 200 atmospheres.

16. A method for making a polymeric product characterized by the repeating unit

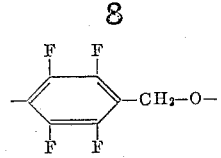

which comprises reacting 2,3,4,5,6-pentafluorobenzyl alcohol with an aqueous solution of a strong base having a cation component capable of forming a salt with the anion

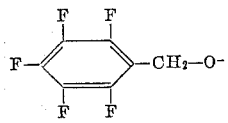

17. A method of making a polymeric product characterized by the repeating unit

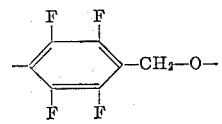

which comprises reacting 2,3,4,5,6-pentafluorobenzyl bromide with sodium carbonate at a temperature of between about −20 and about 200° C. and at a pressure of between about 1 and about 200 atmospheres.

18. A method for making a polymeric product characterized by the repeating unit

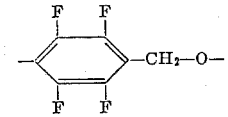

which comprises reacting 2,3,4,5,6-pentafluorobenzyl bromide with sodium carbonate to form a polymer and 2,3,4,5,6-pentafluorobenzyl alcohol, and then reacting said alcohol with potassium hydroxide, said reactions being carried out at temperatures between about −20 and about 200° C. and at pressures between about 1 and about 200 atmospheres.

19. A method for making 2,3,4,5,6-pentafluorobenzyl alcohol which comprises reacting 2,3,4,5,6-pentafluorobenzyl bromide with aqueous sodium carbonate at a temperature of between about −20 and about 200° C. and at a pressure of between about 1 and about 200 atmospheres.

References Cited by the Examiner

FOREIGN PATENTS 269,973  4/1927  Great Britain.

BERNARD HELFIN, *Acting Primary Examiner.*

W. H. SHORT, *Examiner.*

H. D. ANDERSON, *Assistant Examiner.* ml.). Separation of the ethereal layer, extraction of the aqueous layer with ether (4× 100 ml.), and distillation of the dried (MgSO₄) extract gives 2,3,4,5,6-pentafluorotoluene (30.2 g.; 69%), identical with the compound described in Method 1.

This compound may then be converted to pentafluorobenzyl chloride and pentafluorobenzyl bromide by the following procedures:

*Chlorination of 2,3,4,5,6-pentafluorotoluene*

Pentafluorotolene (4.76 g.; 26.2 millimoles) and chlorine (1.86 g.; 26.2 millimoles) are sealed, under vacuum, into a 180 ml. silica tube and irradiated by a 250 w. mercury discharge tube for 3 hours. Hydrogen chloride is evolved. The liquid products are washed from the tube with ether (50 ml.), and the ethereal solution is washed with 2% aqueous sodium carbonate, 2% aqueous sodium sulphite, and water and dried (MgSO₄). Distillation gives a fraction consisting of pure 2,3,4,5,6-pentafluorobenzyl chloride (1.21 g.) (Found: C, 38.8; H, 0.9. C₇H₂ClF₅ requires C, 38.8; H, 0.9%), B.P. 156–157°/750 mm., $n_D^{20}$ 1.4432. Chromatographic analysis of the remaining fractions shows the following total yields: pentafluorotoluene, 1.00 g., 21%; pentafluorobenzyl chloride, 3.56 g., 63%; pentafluorobenzal chloride 0.59 g., 9%; products of B.P. >180°, 0.2 g., 3–4%.

*Bromination of 2,3,4,5,6-pentafluorotoluene*

Bromine (15.0 g.; 94.0 millimoles) is added over 75 minutes to pentafluorotoluene (15.0 g.; 82.5 millimoles), heated under reflux on a bath at 140° C. and irradiated by a 100 w. incandescent bulb. Heating and irradiation are continued for a further 30 minutes, and the mixture is then cooled, dissolved in ether (50 ml.), and washed with 1% aqueous sodium hydroxide (50 ml.), 2% aqeous sodium sulphite (25 ml.), and water (50 ml.). The dried (Mg. SO₄) ethereal solution is distilled to give pentafluorotoluene (0.76 g.; 5%), B.P. 116–119°, and 2,3,-4,5,6-pentafluorobenzyl bromide (16.9 g.; 85%) (Found: C, 32.3; H, 0.9. C₇H₂Br₂₀F₅ requires C, 32.2; H, 0.8%), B. P. 175–177°/761 mm. $n_D^{20}$ 1.4710.

*Preparation of 2,3,4,5,6-pentafluorobenzyl alcohol*

The compound 2,3,4,5,6-pentafluorobenzyl alcohol may be made from the reaction of the corresponding bromide and sodium carbonate as described in Example 3 above. It can also be made by reacting 2,3,4,5,6-pentafluorobenzyl acetate with sodium carbonate, as follows:

2,3,4,5,6-pentafluorobenzyl acetate (5.3 g., 0.022 mole) and sodium carbonate (3.0 g., 0.028 mole) in water (50 ml.) are heated under reflux for 10 hours. The mixture is then extracted with ether, and the extracts are dried (MgSO₄) and distilled to give 2,3,4,5,6-pentafluorobenzyl alcohol (3.4 g., 78%), B.P. 110–112°/50 mm., identified by infrared spectroscopy and gas-liquid chromatography.

What is claimed is:

1. A polymer consisting essentially of a chain of from 2 to about 10,000 repeating units having the formula

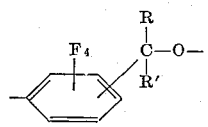

where R and R' are hydrogen or a methyl group.

2. A polymer as claimed in claim 1 wherein R and R' are hydrogen.

3. A polymer consisting essentially of a chain of from 2 to about 10,000 repeating units having the formula

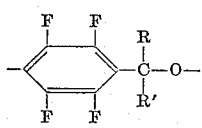

where R and R' are hydrogen or a methyl group.

4. A polymer consisting essentially of a chain of from 2 to about 10,000 repeating units having the formula

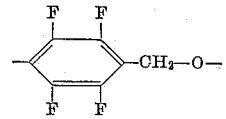

5. A method for making polymeric material which comprises reacting a compound having the general formula

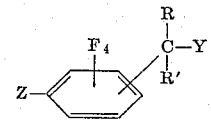

where Z is fluorine, chlorine or bromine, Y is chlorine, bromine, iodine, acyloxy or hydroxyl and R and R' are hydrogen or methyl groups with an aqueous solution of a strong base having a cation component capable of forming a salt with the anion

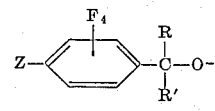

at a temperature between about −20 and about 200° C. and at a pressure of between about 1 and about 200 atmospheres.

6. The method claimed in claim 5 wherein the concentration of base is between about 0.01 N and about 20 N.

7. The method claimed in claim 5 wherein the Z and —CRR'Y groups are in the para position relative to one another.

8. The method claimed in claim 5 wherein the strong base is selected from the group consisting of aqueous solutions of the alkali and alkaline earth metal hydroxides and the salts of such hydroxides with weak acids.

9. The method claimed in claim 5 wherein the strong base is potassium hydroxide.

10. The method claimed in claim 9 wherein the strong base is sodium carbonate.

11. A method for making polymeric material which comprises reacting a compound having the general formula

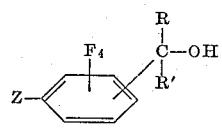

where Z is fluorine, chlorine or bromine, and R and R' are hydrogen or methyl, with an alkali or alkaline earth metal, at a temperature of between about −20 and about 200° C. and at a pressure of between about 1 and about 200 atmospheres.

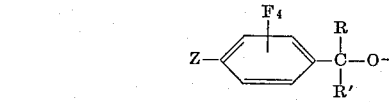

12. The method claimed in claim 11 wherein the —Z and —CRR'Y groups are in the para position relative to one another.

13. A method for making polymeric material which comprises reacting a compound have the general formula

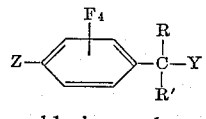

where Z is fluorine, chlorine or bromine, Y is chlorine, bromine, iodine, acyloxy or hydroxyl and R and R' are hydrogen or a methyl group, with a material selected from the group consisting of (a) aqueous solutions of

UNITED STATES PATENT OFFICE
CERTIFICATE OF CORRECTION

Patent No. 3,321,531                                                May 23, 1967

Robert Neville Haszeldine et al.

It is hereby certified that error appears in the above numbered patent requiring correction and that the said Letters Patent should read as corrected below.

Column 2, line 18, after "base" insert -- and --; line 52, for "bromoethyl" read -- bromomethyl --; column 6, lines 56 to 60, strike out

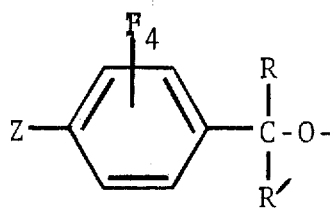

same column 6, line 66, for "have" read -- having --.

Signed and sealed this 11th day of February 1969.

(SEAL)
Attest:

EDWARD M. FLETCHER, JR.                         EDWARD J. BRENNER
Attesting Officer                               Commissioner of Patents